US008522254B2

(12) United States Patent
Hickey et al.

(10) Patent No.: US 8,522,254 B2
(45) Date of Patent: Aug. 27, 2013

(54) PROGRAMMABLE INTEGRATED PROCESSOR BLOCKS

(75) Inventors: Mark J. Hickey, Rochester, MN (US); Eric O. Mejdrich, Woodinville, WA (US); Adam J. Muff, Rochester, MN (US); Paul E. Schardt, Rochester, MN (US); Robert A. Shearer, Rochester, MN (US); Matthew R. Tubbs, Rochester, MN (US); Charles D. Wait, Byron, MN (US)

(73) Assignee: International Business Machines Corporation, Armonk, NY (US)

( * ) Notice: Subject to any disclaimer, the term of this patent is extended or adjusted under 35 U.S.C. 154(b) by 369 days.

(21) Appl. No.: 12/823,745

(22) Filed: Jun. 25, 2010

(65) Prior Publication Data

US 2011/0321049 A1    Dec. 29, 2011

(51) Int. Cl.
*G06F 3/00* (2006.01)
*G06F 15/00* (2006.01)

(52) U.S. Cl.
USPC ............................................ 719/310; 712/32

(58) Field of Classification Search
USPC .................................. 719/314, 310; 712/32
See application file for complete search history.

(56) References Cited

U.S. PATENT DOCUMENTS

| 4,914,653 | A | * | 4/1990 | Bishop et al. ................. 370/462 |
| 5,212,789 | A | * | 5/1993 | Rago ..................................... 1/1 |
| 5,537,601 | A | * | 7/1996 | Kimura et al. .................. 712/35 |
| 6,021,511 | A | * | 2/2000 | Nakano ........................... 714/48 |
| 6,912,716 | B1 | * | 6/2005 | Johanson et al. ............. 719/312 |
| 7,477,999 | B2 | * | 1/2009 | Wegener ......................... 702/66 |
| 7,856,534 | B2 | * | 12/2010 | Van Doren et al. ........... 711/141 |
| 8,195,859 | B2 | * | 6/2012 | Le Moal ........................ 710/200 |
| 2003/0037117 | A1 | * | 2/2003 | Tabuchi ......................... 709/207 |
| 2007/0079161 | A1 | * | 4/2007 | Gupta ........................... 713/324 |

OTHER PUBLICATIONS

Dong-Ik, Utilization Bounds for N-Processor Rate Monotone Scheduling with Static Processor Assignment, 1998.*

* cited by examiner

*Primary Examiner* — Lechi Truong
(74) *Attorney, Agent, or Firm* — Toler Law Group

(57) ABSTRACT

An integrated processor block of the network on a chip is programmable to perform a first function. The integrated processor block includes an inbox to receive incoming packets from other integrated processor blocks of a network on a chip, an outbox to send outgoing packets to the other integrated processor blocks, an on-chip memory, and a memory management unit to enable access to the on-chip memory.

18 Claims, 5 Drawing Sheets

PROGRAMMABLE INTEGRATED PROCESSOR BLOCKS

I. FIELD OF THE DISCLOSURE

The present disclosure relates generally to hardware processing, and more specifically, to programmable integrated processor blocks.

II. BACKGROUND

Microprocessors may be designed with multiple processing elements, in which each processing element is programmed to perform a single function. For example, a graphics processing unit may have a first processing element (e.g., a geometry engine) that is dedicated to performing a first function and a second processing element (e.g., a rasterizer) that is dedicated to performing a second function. The function that each processing element may perform may be specified when the microprocessor is designed, i.e., before the microprocessor is manufactured. In such a microprocessor, the functions of each processing element may not be changed after the microprocessor is manufactured. When the function of each dedicated processing element may not be changed after manufacturing the microprocessor, the processing elements may not be reassigned to perform different functions to dynamically balance a workload among the processing elements.

III. SUMMARY

In a particular embodiment, a network on a chip includes a plurality of integrated processor blocks including a first integrated processing block. The first integrated processor block includes an inbox to receive incoming packets from other integrated processor blocks of the plurality of integrated processor blocks. The first integrated processor block includes an outbox to send outgoing packets to the other integrated processor blocks. The first integrated processor block also includes an on-chip memory and a memory management unit to enable access to the on-chip memory. The integrated processor block is programmable to perform a particular function.

In another particular embodiment, a computer program product includes a non-transitory computer usable medium having computer usable program code embodied therewith. The computer usable program code is executable by a processor to program a first integrated processor block of a plurality of integrated processor blocks to perform a first function. The first integrated processor block includes an inbox to receive incoming packets from other integrated processor blocks of the plurality of integrated processor blocks of a network on a chip. The first integrated processor block also includes an outbox to send outgoing packets to the other integrated processor blocks of the network on a chip. The first integrated processor block further includes an on-chip memory and a memory management unit to manage the on-chip memory.

In another particular embodiment, a method includes programming a first integrated processor block of a plurality of integrated processor blocks to perform a first function. The first integrated processor block includes an inbox to receive incoming packets from the other integrated processor blocks, an outbox to send outgoing packets to the other integrated processor blocks of the network on a chip, and an on-chip memory.

These and other advantages and features that characterize embodiments of the disclosure are set forth in the claims annexed hereto and forming a further part hereof. However, for a better understanding of the disclosure, and of the advantages and objectives attained through its use, reference should be made to the drawings and to the accompanying descriptive matter in which there are described exemplary embodiments of the disclosure.

IV. BRIEF DESCRIPTION OF THE DRAWINGS

V. DETAILED DESCRIPTION

Figure 1:
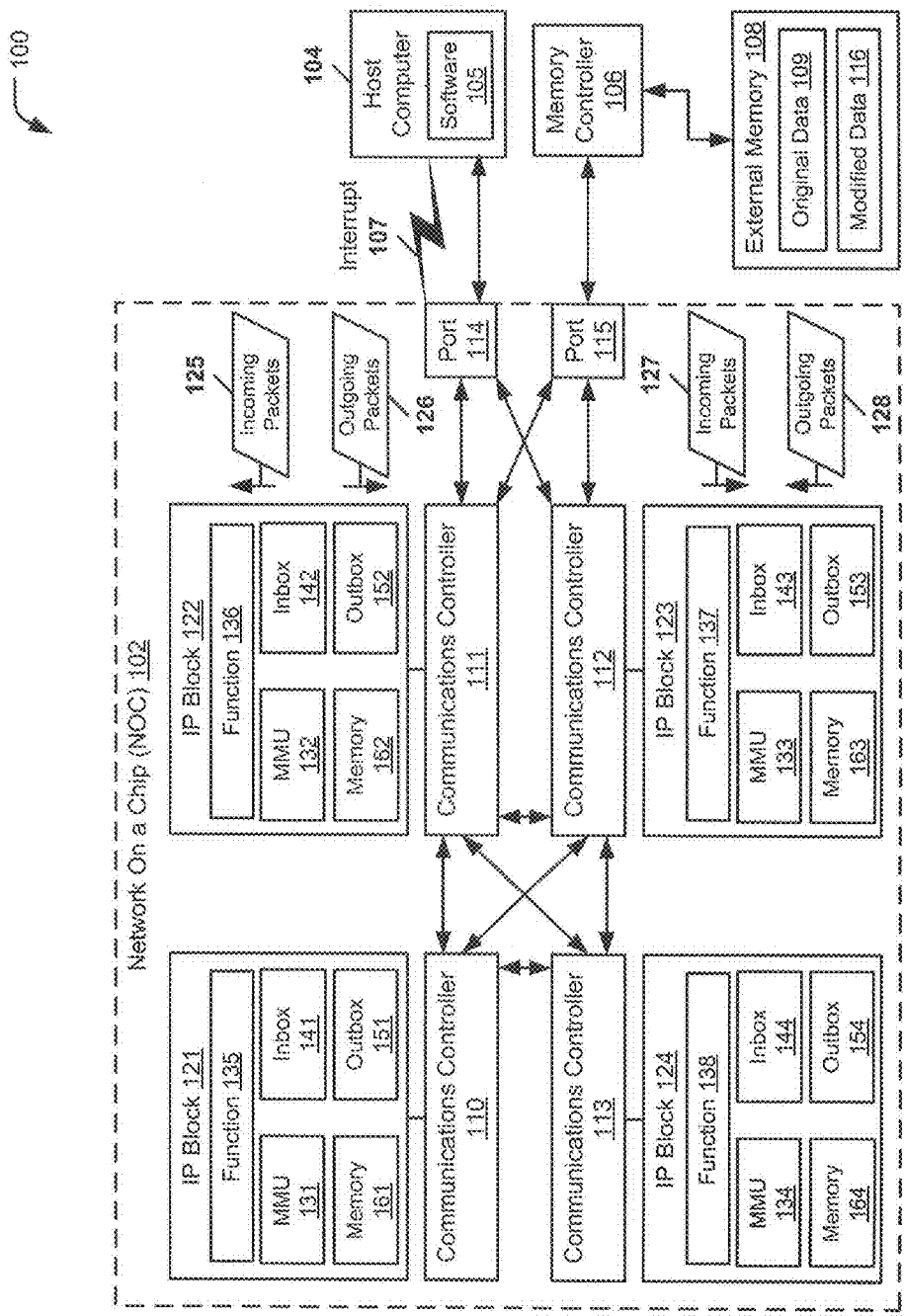
FIG. 1 is a block diagram of a first embodiment of a system that includes programmable integrated processor blocks.

Referring to FIG. 1, a block diagram of a first embodiment of a system that includes programmable integrated processor blocks is depicted and generally designated 100. The system 100 includes a network on a chip 102 that is coupled to a host computer 104 and to a memory controller 106. In the system 100, the host computer 104 may program/reprogram integrated processor blocks of the network on a chip 102 to perform various functions based on a workload associated with the network on a chip 102 to distribute the workload of the network on a chip 102 among the integrated processor blocks.

The host computer 104 may include software 105 that runs on the host computer 104. For example, the software 105 may include an operating system and one or more software applications.

The memory controller 106 may be coupled to an external memory 108. The external memory 108 may include original data 109. For example, the external memory 108 may be random access memory (RAM).

The network on a chip 102 may include a plurality of integrated processing (IP) blocks, such as the IP blocks 121, 122, 123 and 124. Each of the IP blocks 121-124 may be programmable to perform a particular function. For example, the IP block 121 may be programmable to perform a function 135, the IP block 122 may be programmable to perform a function 136, the IP block 123 may be programmable to perform a function 137, and the IP block 124 may be programmable to perform a function 138. To illustrate, the IP block 121 may be programmable to perform a host interface processor function, the IP block 122 may be programmable to perform a geometry engine function, the IP block 123 may be programmable to perform a rasterizer function, and the IP block 124 may be programmable to perform a pixel shader function. Each of the IP blocks 121-124 may be programmable to perform a host interface processor function, a geometry engine function, a rasterizer function, a pixel shader, a ray tracing function, a Z-test function, a physics accelerator function, a compression function, a decompression function, a regular expression parse function, an encrypt function, a decrypt function, an H.264 video codec function, another function or any combination thereof.

Each of the IP blocks 121-124 may include one or more resources, such as an inbox, an outbox, a memory management unit (MMU), and a memory. For example, in FIG. 1, the IP block 121 includes an inbox 141, an outbox 151, a memory management unit 131, and an on-chip memory 161. The IP block 122 includes an inbox 142, an outbox 152, a memory management unit 132, and an on-chip memory 162. The IP block 123 includes an inbox 143, an outbox 153, a memory management unit 133, and an on-chip memory 163. The IP block 124 includes an inbox 144, an outbox 154, a memory management unit 134, and an on-chip memory 164.

Each of the IP blocks 121-124 may be communicatively coupled to a communications controller that enables the IP blocks to communicate among themselves, with the host computer 104, and with the memory controller 106. In FIG. 1, the IP block 121 is communicatively coupled to a communications controller 110, the IP block 122 is communicatively coupled to a communications controller 111, the IP block 123 is communicatively coupled to a communications controller 112, and the IP block 124 is communicatively coupled to a communications controller 113. The communications controllers 110-113 may communicate with the host computer 104 via port 114 and with the memory controller 106 via port 115. The communications controllers 110-113 may include packet routing functionality, packet switching functionality, other communications functionality, or any combination thereof.

The inboxes 141-144 may receive incoming packets for the integrated processor blocks 121-124. For example, the inbox 142 may enable the IP block 122 to receive incoming packets 125 from one or more of the IP block 121, the IP block 123, and the IP block 124. The IP blocks 121-124 may use the outboxes 151-154 to send outgoing packets. For example, the outbox 152 of the IP block 122 may be used to send outgoing packets 126 to one or more of the IP block 121, the IP block 123 and the IP block 124.

The MMUs 131-134 of the IP blocks 121-124 may enable access to on-chip memory. For example, the IP block 121 may use the MMU 131 to access the on-chip memory 161. The IP block 122 may use the MMU 132 to access the on-chip memory 162. The IP block 123 may use the MMU 133 to access the on-chip memory 163. The IP block 124 may use the MMU 134 to access the on-chip memory 164.

The IP blocks 121-124 may be programmable to perform coherent or non-coherent memory operations using the on-chip memories 161-164. In a coherent memory operation, when a processing element of the system 100 reads a value of particular data, the value is the same no matter which processing element reads the value. For example, the IP block 121 may read the original data 109 from the external memory 108, modify the original data 109 to create modified data 116, and write the modified data 116 to the external memory 108. When the IP blocks 122-124 access the data, they access the modified data 116. Maintaining memory coherency may require a significant amount of memory management overhead. For example, when the modified data 116 is written to the external memory 108, all memories (e.g., cache memory or pipeline memory) that include the original data 109 may be flushed. In some instances, the IP blocks 121-124 may perform their respective functions faster using non-coherent memory operations, with the coherency managed by the software 105. For example, when the software 105 has programmed the IP blocks 121-124 with read-only access to the original data 109 (i.e., the IP blocks may not be programmed to modify the original data 109), coherency operations may not be needed. In another example, the software 105 may have programmed the IP block 121 with read-write access to the original data 109 and programmed the IP blocks 122-124 with read-only access to the original data 109. In this example, the software 105 may instruct the IP blocks 122-124 to flush their respective on-chip memories 162-164 under specific circumstances. For example, when the software 105 determines that the IP block 121 has created the modified data 116 and determines that the IP block 122 has a copy of the unmodified original data 109, the software 105 may instruct the IP block 122 to flush the on-chip memory 162. The software 105 may send the instruction to flush the on-chip memory 162 to the IP block 122 via the incoming packets 125. The incoming packets 125 may include the original data 109 or the modified data 116.

In operation, each of the IP blocks 121-124 may be programmable to perform a particular function. To illustrate, the IP block 121 may be programmable to perform the function 135, the IP block 122 may be programmable to perform the function 136, the IP block 123 may be programmable to perform the function 137, and the IP block 124 may be programmable to perform the function 138. The IP blocks 121-124 may be programmable to perform the functions 135-138 via software instructions, such as the software 105. For example, the software 105 may send the incoming packets 125 to the IP block 122. The incoming packets 125 may include instructions (not shown) or a pointer (not shown) to instructions to program the IP block 122 to perform the function 136. The IP blocks 121-124 may be programmable to perform at least one of a host interface processor function, a geometry engine function, a rasterizer function, a pixel shader, a ray tracing function, a Z-test function, a physics accelerator function, a compression function, a decompression function, a regular expression parse function, an encrypt function, a decrypt function, an H.264 video codec function, another function or any combination thereof.

In a particular embodiment, the IP blocks 121-124 may wake from a low power sleep state and perform one or more actions. For example, the IP block 121 may awaken from a low power sleep state via an interrupt 107 or based on an action performed by one of the IP blocks 122-124. One of the actions that the IP blocks 121-124 may perform after awaking from a low power sleep state may be to query their respective inbox for newly received incoming packets. For example, in response to being woken by the interrupt 107, the IP block 123 may query the inbox 143 to determine whether incoming packets, such as the incoming packets 127, have been received at the inbox 143. The IP blocks 121-124 may perform one or more functions after receiving the incoming packets 125, 127. For example, the IP block 122 may perform one or more actions, such as an Motion Picture Experts Group (MPEG) codec function, based on the incoming packets 125 received at the inbox 142. To illustrate, the IP block 122 may code or decode the incoming packets 125 after being woken from a sleep state by the interrupt 107.

In a particular embodiment, the IP blocks 121-124 may perform one or more functions based on a content of their respective on-chip memories 161-164. For example, the IP block 121 may perform various actions, based on a content of the on-chip memory 161. To illustrate, the content of the on-chip memory 161 may include instructions or a pointer to instructions that the IP block 121 may execute to perform the function 135. In another example, the IP block 121 may be capable of performing multiple functions. The content of the on-chip memory 161 may cause the IP block 121 to perform the function 135 by selecting the function 135 from the multiple functions. For example, the IP block 121 may be programmed to perform one of several different functions, such as geometry engine function, rasterizer function, and pixel shader function. The content of the on-chip memory 161 may select a particular function, such as the pixel shader function, for the IP block 121 to perform. To illustrate, the content of the on-chip memory 161 may select the third function of the pre-programmed functions for the IP block 121 to perform.

The IP blocks 121-124 may measure performance statistics when performing the one or more actions. For example, when the function 136 of the IP block 122 is a pixel shader function, the IP block 122 may measure performance statistics associated with rendering an object at a display device. The IP block 122 may store the performance statistics at the memory 162. The performance statistics may include a number of central processing unit (CPU) cycles executed to render the object, a time taken to render the object, another performance statistic, or any combination thereof.

The IP blocks 121-124 may be programmable by the software 105 to perform the functions 135-138. For example, the software 105 may initially program the IP blocks 121 and 122 to perform a rasterizer function and program the IP blocks 123 and 124 to perform a pixel shader function. The IP blocks 121-124 may measure performance statistics associated with performing their respective functions and store the performance statistics at their respective on-chip memories 161-164. The software 105 may retrieve the performance statistics and reassign one or more of the IP blocks 121-124. For example, the software 105 may program the IP block 122 to perform a pixel shader function when a workload of the IP block 123 or the IP block 124 satisfies the particular threshold. For example, when the number of CPU cycles taken by the IP block 123 to perform a pixel shader function to render an object in a three-dimensional image satisfies the particular threshold, the software 105 may program the IP block 122 to perform the pixel shader function to assist the IP block 123 in rendering the object.

Each of the IP blocks 121-124 may receive one or more incoming packets at their respective inboxes, process the incoming packets, and send results based on processing the incoming packets to one or more of the other integrated processor blocks 121-124. For example, the IP block 122 may process the incoming packets 125 and send the results of processing the incoming packets 125 as the outgoing packets 126 to one or more of the IP blocks 121, 123, and 124. To illustrate, the IP block 122 may receive primitive data structures that represent graphic primitives, scan a two-dimensional area to determine whether to draw a pixel at a particular location in the two-dimensional area based on properties of the primitive data structures, and send the results of the determination to the IP block 123. For example, the IP block 123 may be instructed to perform a pixel shader function.

Each of the IP blocks 121-124 may perform an action that causes at least one of the other IP blocks to wake up from a low power sleep state. For example, the IP block 122 may perform a particular action, such as sending the outgoing packets 126 to the inbox 143 of the IP block 123, that causes the IP block 123 to wake up from a low power sleep state.

Each of the IP blocks 121-124 may write the original data 109 to the external memory 108 without using their respective outboxes 151-154. Each of the IP blocks 121-124 may send an outgoing packet that includes a location of the original data 109 in the external memory 108. For example, the IP block 122 may be operable to write the original data 109 in the external memory 108 without using the outbox 152. To illustrate, the IP block 122 may use the communications controller 111 via the port 114 to access the main controller 106 to write the original data 109 in the external memory 108. The IP block 122 may send the outgoing packets 126 to the software 105 via the port 114. The outgoing packets 126 may include a location of the original data 109 in the external memory 108.

The on-chip memories 161-164 of the IP blocks 121-124 may be used to buffer at least one of the incoming packets. For example, when the IP block 122 performs a video decoding function, the IP block 122 may use the memory 162 to buffer the incoming packets 125 or the outgoing packets 126 to enable a smooth flow of the packets. This may be done to provide a smooth stream of data packets.

Each of the IP blocks 121-124 may be programmed to perform an error handling function, a recovery from error function, another error recovery function, or any combination thereof. For example, an exception event may occur at the host computer 104, causing the interrupt 107 to awaken the IP block 122 from a sleep state. The IP block 122 may determine what type of exception event occurred and perform a particular set of actions based on the type of the exception event.

Thus, the IP blocks 121-124 may be programmable processing elements that can be programmed to perform the functions 135-138. The IP blocks 121-124 may be programmed and re-programmed to perform different functions in real-time. For example, the IP blocks 121-124 may measure performance statistics when performing their respective functions 135-138 and store the performance statistics at the on-chip memories 161-164. For example, the performance statistics may be measured and stored after each frame of a video game or an animated movie is rendered. The performance statistics may include a number of central processing unit (CPU) cycles executed to render the object, a time taken to render the object, another performance statistic, or any combination thereof. The performance statistics may be used to program one or more of the IP blocks 121-124 to perform a different function to distribute a workload among the IP blocks 121-124. For example, the IP block 121 may perform a geometry engine function, the IP block 122 may perform a rasterizer function, and the IP block 123 may perform a pixel shader function. The software 105 may program/reprogram the function 138 of the IP block 124 based on workloads of the IP blocks 121-123. To illustrate, the performance statistics measured by the IP block 123 may indicate that the IP block 123 has a workload that is greater than the IP blocks 121-122. The software 105 may program the IP block 124 to perform the pixel shader function. After a few cycles, the performance measurements may indicate that the IP block 121 has a workload that is greater the IP blocks 122-123. The software 105 may reprogram the IP block 124 from performing the pixel shader function to performing the geometry engine function. In this way, the software 105 may program/reprogram the IP blocks 121-124 to balance a workload of the network on a chip 102 among the IP blocks 121-124.

Figure 2:
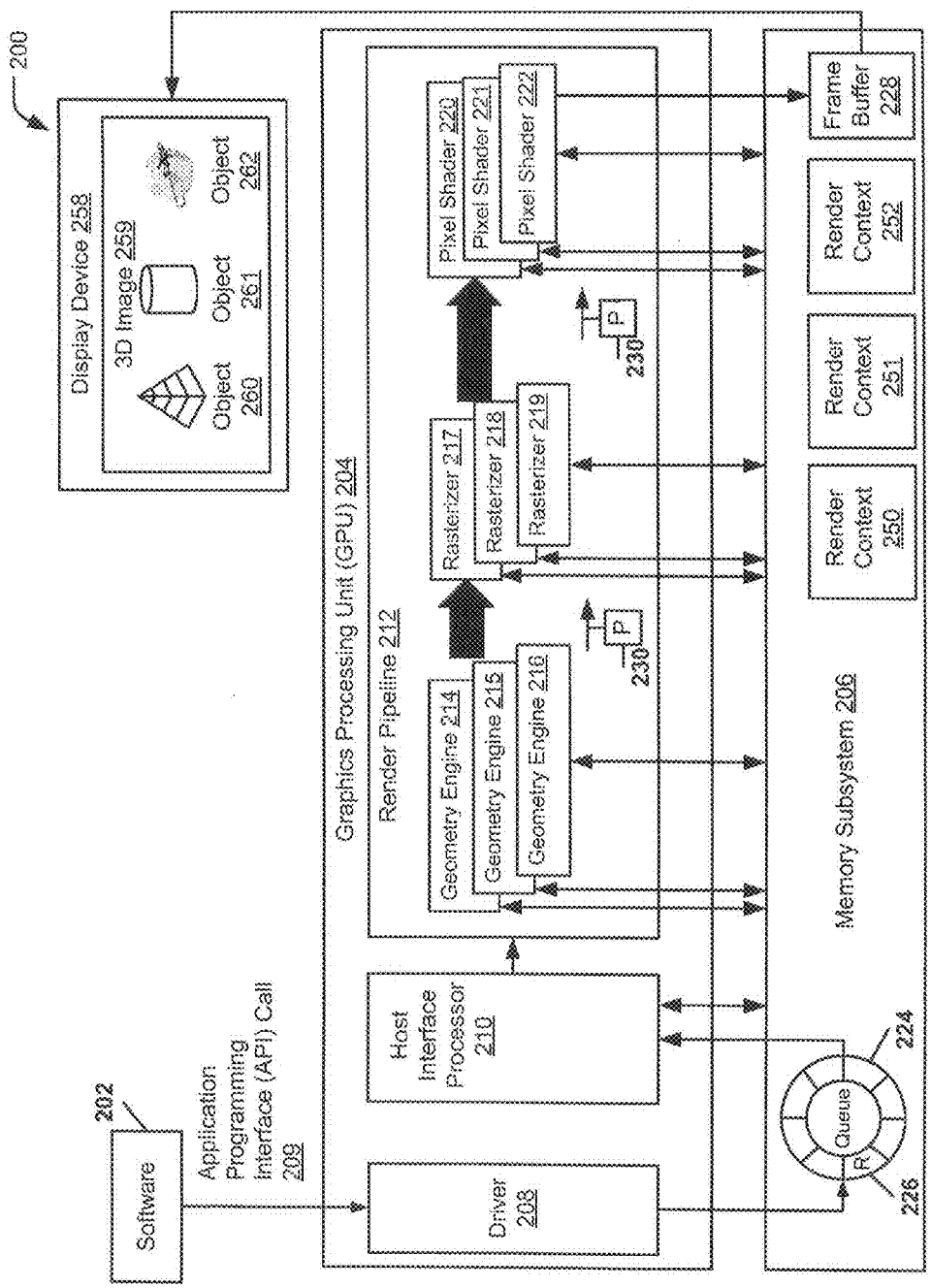
FIG. 2 is a block diagram of a second embodiment of a system that includes programmable integrated processor blocks.

Referring to FIG. 2, a block diagram of a second embodiment of a system that includes programmable integrated processor blocks is depicted and generally designated 200. The system 200 includes software 202, a graphics processing unit (GPU) 204, and a memory subsystem 206 coupled to a display device 258. The system 200 may render a three-dimensional ("3D") image 259 at the display device 258. Rendering is a process of generating an image using data structures that model the image. The data structures may be processed using a computer program having processor executable instructions to render the image.

The graphics processing unit 204 is operable to render a three-dimensional image 259 at the display device 258 based on a request 226 from the software 202. The request 226 may be received from the software 202 via API calls, such as the API call 209. The graphics processing unit 204 includes a driver 208, a host interface processor 210, and a render pipeline 212. The software 202 may use the API call 209 to initiate generation of three-dimensional images, such as the three-dimensional image 259, for display at the display device 258. In response to the API call 209, the driver 208 may place a request at the queue 224 for the host interface processor 210.

The memory subsystem 206 includes a queue 224 and a frame buffer 228. The queue 224 may be used to queue up requests, such as the request 226, that are received via the API call 209 from the software 202. The host interface processor 210 may retrieve and process the requests in the queue 224. The frame buffer 228 may be used to buffer frames of three-dimensional images generated by the graphics processing unit 204 for display at the display device 258.

The render pipeline 212 includes multiple processing elements 214-222 that may be assigned different tasks by the host interface processor 210. Each processing element may be an integrated processor block of a network on a chip, such as one of the IP blocks 121-124 of FIG. 1. In FIG. 2, the processing elements may include the host interface processor 210, three geometry engine elements 214, 215, and 216, three rasterizer elements 217, 218, and 219, and three pixel shader elements 220, 221, and 222. The host interface processor 210 may dynamically (e.g., in real-time) change the allocation of the number of processing elements performing a particular function. For example, the host interface processor 210 may take the geometry engine element 214 and reassign it as an additional pixel shader element or as an additional rasterizer element based on a workload associated with each of the processing elements 214-222. For example, the host interface processor 210 may change the allocation of the number of processing elements performing a particular function based on performance measurements associated with rendering a particular object.

In a particular embodiment, the host interface processor 210 may assign one of the processing elements 214-222 a particular function by sending microcode to the processing element to execute to perform the particular function. In another particular embodiment, the host interface processor 210 may assign one of the processing elements 214-222 a particular function by sending a pointer to microcode. In yet another particular embodiment, the host interface processor 210 may assign one of the processing elements 214-222 a particular function by selecting a pre-programmed function of the processing element. For example, each of the processing elements 214-222 may be pre-programmed to perform several functions (e.g., a geometry engine function, a rasterizer function, and a pixel shader function), and the host interface processor 210 may select from among the pre-programmed functions. To illustrate, the processing elements 214-222 may be assigned a default function when the graphics processing unit 204 is manufactured and the host interface processor 210 may dynamically program/reprogram the processing elements 214-222.

The host interface processor 210 may execute instructions (not shown), such as firmware or microcode, to perform various functions. The processing elements 214-222 may execute instructions (not shown) to perform various functions. The instructions executed by the host interface processor 210 and the processing elements 214-222 may be stored at a non-transitory computer readable medium, such as the on-chip memories 161-164 of FIG. 1.

The graphics processing unit 204 may periodically render a frame, i.e., the three-dimensional image 259, for display at the display device 258. For example, the graphics processing unit 204 may generate thirty or more frames per second. When a particular object of the three-dimensional image 259 is complex and requires additional resources to render the particular object (e.g., when the object was not completely rendered within one thirtieth of a second in a particular frame), the host interface processor 210 may allocate or reassign resources to render the particular object before the next frame is rendered.

In operation, the software 202 may make an API call 209 to the driver 208 to place a request 226 in the queue 224. The request 226 may be to render a portion of the three-dimensional image 259 at the display device 258. The host interface processor 210 may retrieve the request 226 from the queue 224 and instruct the render pipeline 212 to render a portion of the three-dimensional image 259 at the display device 258. The three-dimensional image 259 may include objects 260, 261, and 262.

The geometry engine elements 214-216 may break one of the objects 260-262 of the three-dimensional image 259 into primitives and send a primitive data structure 230 (that represents the primitive) to one of the rasterizer elements 217-219. The primitive data structure 230 may include properties of a geometric primitive, such as a triangle, a rectangle, a cube, or a cylinder, that is used to render one of the objects 260-262. The rasterizer elements 217-219 may receive the primitive data structure 230 from the geometry engine elements 214-216. The rasterizer elements 217-219 may scan a two-dimensional area (i.e., a two-dimensional area that is mapped to the display device 258) to determine whether to draw a pixel at a particular location in the two-dimensional area based on properties of the primitive data structure 230. The rasterizer elements 217-219 may send the primitive data structure 230 to one of the pixel shader elements 220-222.

The pixel shader elements 220-222 may execute instructions to perform various functions. One of the pixel shader elements 220-222 may receive the primitive data structure 230 and render a portion of one of the objects 260-262 based on a render context associated with the object. The render context associated with the object may include information related to converting a geometric primitive into individual pixels for display at a display device. For example, the pixel shader element 220 may render the object 260 based on the render context 250, the pixel shader element 221 may render the object 261 based on the render context 251, and the pixel shader element 152 may render the object 262 based on the render context 252. To illustrate, the render context 250 may be used by the pixel shader element 220 to determine the individual pixels for display at the display device 258.

The pixel shader elements 220-222 may measure at least one performance statistic associated with rendering the objects 260-262 and store the performance statistic in the render context associated with the object. For example, when the pixel shader element 220 renders the object 260, the pixel shader element 220 may measure a performance statistic associated with rendering the object 260 and store the performance statistic in the render context 250. The performance statistics may include one or more of a number of elapsed clock cycles to render an object in a previous frame, a number of instructions executed to render an object in the previous frame, a cache hit rate associated with rendering an object in the previous frame, a ratio of floating point instructions executed to integer point instructions executed to render an object in the previous frame, another performance statistic related to rendering an object in the previous frame, or any combination thereof.

The host interface processor 210 may use the performance statistics that are stored in the render contexts 250-252 to determine whether to assign or reassign the processing elements 214-222 to different functions. For example, when a performance statistic associated with rendering an object in a previous frame satisfies a threshold, the host interface processor 210 may allocate additional processing elements to render the object in a subsequent frame. To illustrate, after the host interface processor 210 determines that a number of instructions executed by the pixel shader element 222 to render the object 262 in a first frame satisfies the threshold, the host interface processor 210 may reassign the rasterizer element 217 as a fourth pixel shader element before the object 262 is rendered in a subsequent frame. For example, the host interface processor 210 may delineate two portions (e.g., a top half and a bottom half) of the object 262 and assign the pixel shader element 222 to render a first portion (e.g., the top half) of the object 262 and assign reassigned rasterizer element 217 to render a second portion (e.g., the bottom half) of the object 262.

Thus, the programmable processing elements 214-222 may be dynamically programmed/reprogrammed by the host interface processor 210 based on a workload associated with each of the programmable processing elements 214-222. For example, the host interface processor may reassign one or more of the processing elements 214-222 to enable the workload of the graphics processing unit 204 to be distributed relatively evenly across the processing elements 214-222.

Figure 3:
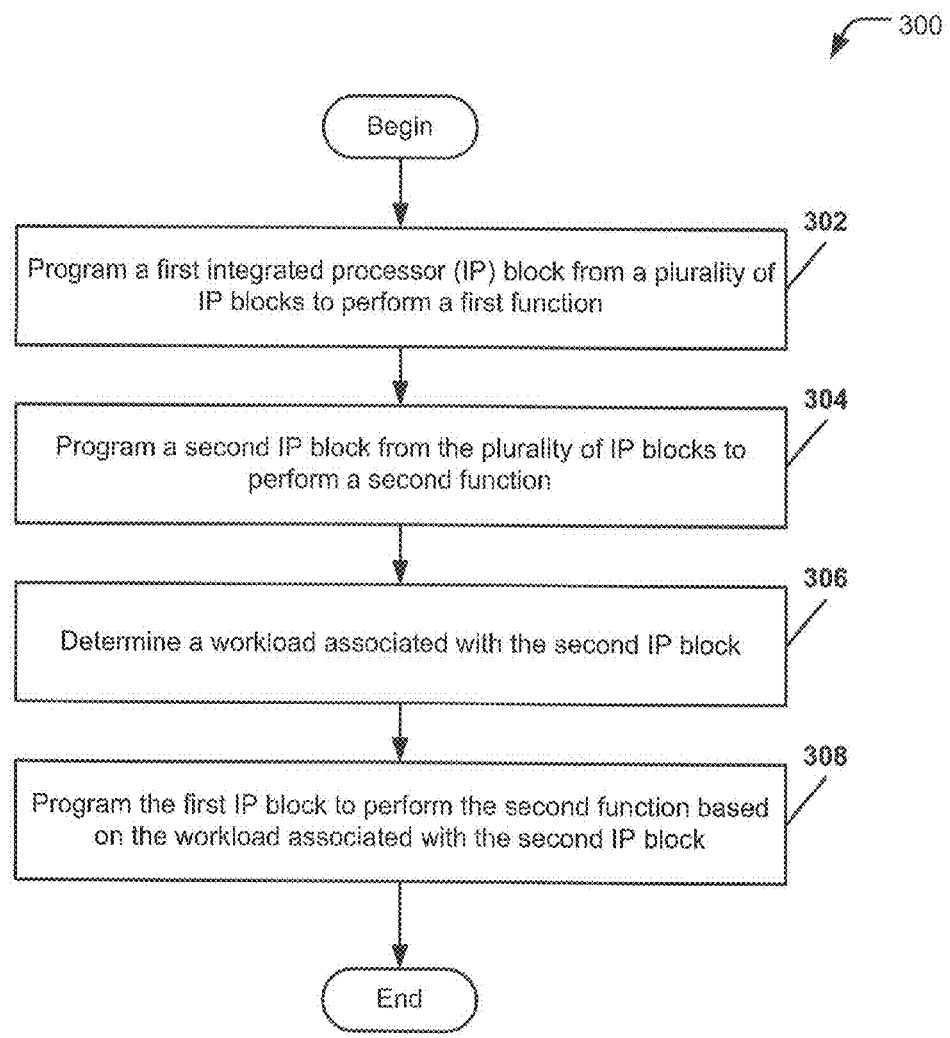
FIG. 3 is a flow diagram of a first method to program an integrated processor block.

Referring to FIG. 3, a flow diagram of a first method to program an IP block is depicted and generally designated 300. The method 300 may be performed by the software 105 of FIG. 1, by the software 202 of FIG. 2, or by the host interface processor 210 of FIG. 2.

The method begins when a first IP block from a plurality of IP blocks is programmed to perform a first function, at 302. Moving to 304, a second IP block from the plurality of IP blocks is programmed to perform a second function. Advancing to 306, a workload associated with the second IP block is determined. Continuing to 308, the first IP block is programmed to perform the second function based on the workload associated with the second IP block and the method ends. For example, in FIG. 1, the software 105 may initially program the IP block 121 to perform a rasterizer function and program the IP block 122 to perform a pixel shader function. The software 105 may determine a workload associated with the IP block 122 and program the IP block 121 to perform the pixel shader function based on the workload associated with the IP block 122.

Thus, processing elements may be dynamically programmed to perform particular functions. For example, a processing element may be programmed to perform a particular function based on a workload associated with another processing element. Processing elements may be reassigned to perform a particular function to enable workloads to be distributed relatively evenly across the processing elements.

Figure 4:
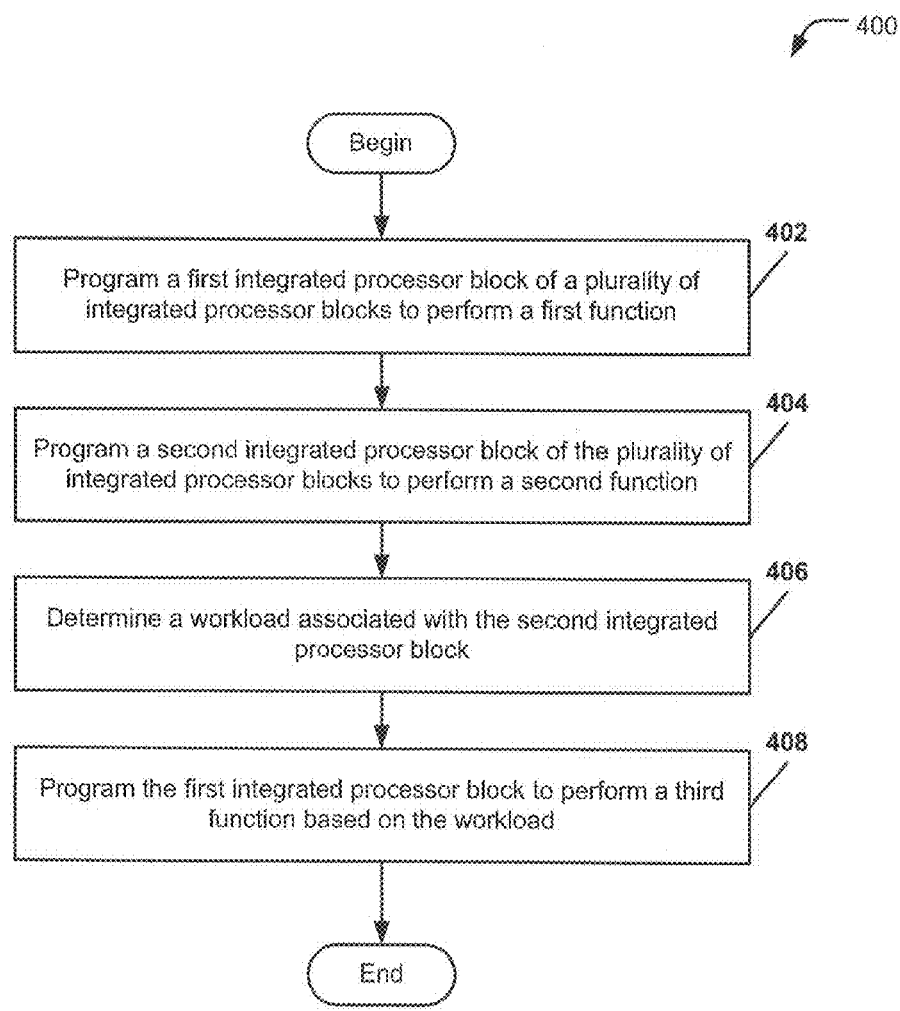
FIG. 4 is a flow diagram of a second method to program an integrated processor block.

Referring to FIG. 4, a flow diagram of a second method to program an integrated processor block is depicted and generally designated 400. The method 400 may be performed by the software 105 of FIG. 1, by the software 202 of FIG. 2, or by the host interface processor 210 of FIG. 2.

The method begins when a first IP block from a plurality of IP blocks is programmed to perform a first function, at 402. Moving to 404, a second IP block of the plurality of IP blocks is programmed to perform a second function. A workload associated with the second IP block is determined, at 406. Proceeding to 408, the first IP block is programmed to perform at third function based on the workload associated with the second IP block and the method ends. For example, in FIG. 2, the host interface processor 210 may program a first IP block to function as the geometry engine 214 and program a second IP block to function as the rasterizer 217. The host interface processor 210 may program the second IP block to function as fourth pixel shader based on a workload of the second IP block.

Thus, processing elements may be dynamically programmed to perform particular functions. For example, a processing element may be programmed to perform a particular function based on a workload associated with another processing element. Processing elements may be reassigned to perform a particular function to enable workloads to be distributed relatively evenly across the processing elements.

Figure 5:
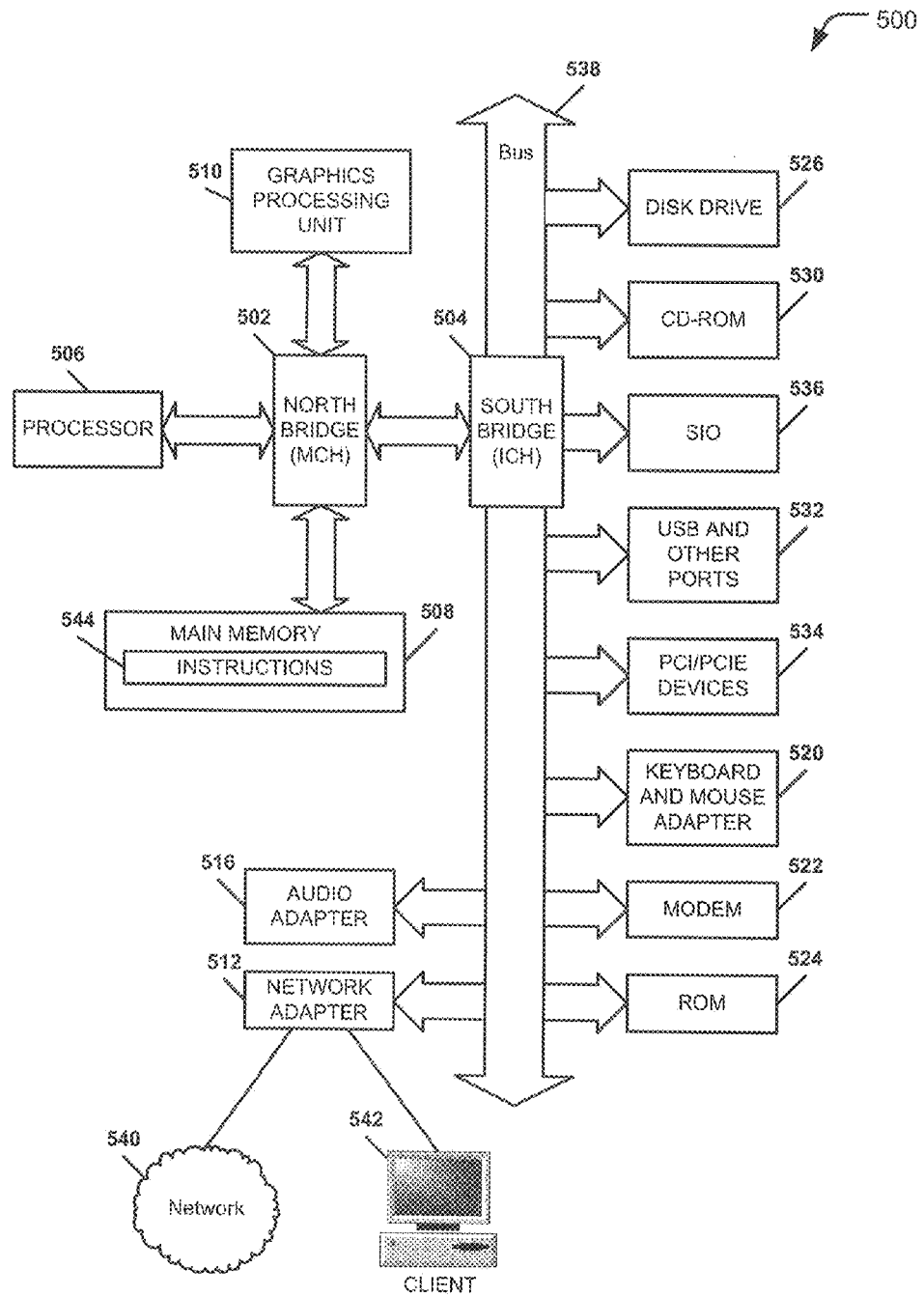
FIG. 5 is a general diagram of a computing system.

Referring to FIG. 5, a block diagram of a computing system in which systems and methods of the present disclosure may be implemented is depicted and generally designated 500. The computing system 500 includes an example of a graphics processing unit 510, such as the graphics processing unit 204 of FIG. 2.

In the depicted example, the computing system 500 employs a hub architecture including a north bridge and a memory controller hub (MCH) 502 and a south bridge and input/output (I/O) controller hub (ICH) 504. A processor 506, a main memory 508, and the graphics processing unit 510 are coupled to the north bridge and memory controller hub 502. For example, the graphics processing unit 510 may be coupled to the MCH 502 through an accelerated graphics port (AGP) (not shown). The main memory 508 may be an external memory, such as the external memory 108 of FIG. 1 or a memory subsystem, such as the memory subsystem 206 of FIG. 2.

In the depicted example, a network adapter 512 is coupled to the south bridge and I/O controller hub 504 and an audio adapter 516, a keyboard and mouse adapter 520, a modem 522, a read only memory (ROM) 524, universal serial bus (USB) ports and other communications ports 532, and Peripheral Component Interconnect (PCI) and Peripheral Component Interconnect Express (PCIe) devices 534 are coupled to the south bridge and I/O controller hub 504 via bus 538. A disk drive 526 and a CD-ROM drive 530 are coupled to the south bridge and I/O controller hub 504 through the bus 538. The PCI/PCIe devices 534 may include, for example, Ethernet adapters, add-in cards, and PC cards for notebook computers. The ROM 524 may be, for example, a flash binary input/output system (BIOS). The disk drive 526 and the CD-ROM drive 530 may use, for example, an integrated drive electronics (IDE) or serial advanced technology attachment (SATA) interface. A super I/O (SIO) device 536 may be coupled to the south bridge and I/O controller hub 504.

The main memory 508 includes computer instructions 544 on a computer readable medium. The computer instructions 544 are executable by the processor 506 or the graphic processing unit 510 to perform various functions. For example, the computer instructions 544 may include the software 105 of FIG. 1 or the software 202 of FIG. 2.

An operating system (not shown) runs on the processor 506 and coordinates and provides control of various components within the computing system 500. The operating system may be a commercially available operating system such as Microsoft® Windows® XP (Microsoft and Windows are trademarks of Microsoft Corporation in the United States, other countries, or both). An object oriented programming system, such as the Java® programming system, may run in conjunction with the operating system and provide calls to the operating system from Java programs or applications executing on the computing system 500 (Java and all Java-based trademarks are trademarks of Sun Microsystems, Inc. in the United States, other countries, or both).

Instructions for the operating system, the object-oriented programming system, and applications or programs are located on storage devices, such as the disk drive 526, and may be loaded into the main memory 508 for execution by the processor 506. The processes of the disclosed illustrative embodiments may be performed by the processor 506 using computer implemented instructions, which may be located in a non-transitory memory such as, for example, the main memory 508, the read only memory 524, or in one or more of the peripheral devices.

The hardware in computing system 500 may vary depending on the implementation. Other internal hardware or peripheral devices, such as flash memory, equivalent non-volatile memory, or optical disk drives and the like, may be used in addition to or in place of the hardware depicted in FIG. 5. Also, the processes of the disclosed illustrative embodiments may be applied to a multiprocessor data processing system.

In some illustrative examples, portions of the computing system 500 may be implemented in a personal digital assistant (PDA), which is generally configured with flash memory to provide non-volatile memory for storing operating system files and/or user-generated data. A bus system may include one or more buses, such as a system bus, an I/O bus and a PCI bus. Of course, the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, the main memory 508 or a cache such as found in the north bridge and memory controller hub 502. A processing unit may include one or more processors or CPUs, such as the processor 506 or the graphics processing unit 510. The depicted examples in FIG. 5 and above-described examples are not meant to imply architectural limitations. For example, portions of the computing system 500 also may be implemented in a personal computer, server, server cluster, tablet computer, laptop computer, or telephone device in addition to taking the form of a PDA.

Particular embodiments of the computing system 500 can take the form of an entirely hardware embodiment or an embodiment containing both hardware and software elements. In a particular embodiment, the disclosed methods are implemented in software that is embedded in processor readable non-transitory medium and executed by a processor, which includes but is not limited to firmware, resident software, microcode, etc.

Further, embodiments of the present disclosure, such as the one or more embodiments in FIGS. 1-5 can take the form of a computer program product accessible from a computer-usable or computer-readable medium providing program code for use by or in connection with a computer or any instruction execution system. For the purposes of this description, a non-transitory computer-usable or computer-readable medium can be any non-transitory medium that can tangibly embody a computer program and that can contain or store the computer program for use by or in connection with the instruction execution system, apparatus, or device.

In various embodiments, the medium can include an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and digital versatile disk (DVD).

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the data processing system either directly or through intervening I/O controllers.

Network adapters may also be coupled to the data processing system to enable the data processing system to become coupled to other data processing systems or remote printers or storage devices through intervening private or public networks. Modems, cable modems, and Ethernet cards are just a few of the currently available types of network adapters.

The previous description of the disclosed embodiments is provided to enable any person skilled in the art to make or use the disclosed embodiments. Various modifications to these embodiments will be readily apparent to those skilled in the art, and the generic principles defined herein may be applied to other embodiments without departing from the scope of the disclosure. Thus, the present disclosure is not intended to be limited to the embodiments shown herein but is to be accorded the widest scope possible consistent with the principles and features as defined by the following claims.

What is claimed is:

1. A first integrated processor block of a plurality of integrated processor blocks of a network on a chip, the first integrated processor block comprising:
   a first inbox to receive incoming packets from the other integrated processor blocks of the plurality of integrated processor blocks of the network on a chip;
   a first outbox to send outgoing packets to the other integrated processor blocks of the plurality of integrated processor blocks of the network on a chip;
   a first on-chip memory; and
   a first memory management unit to enable access to the first on-chip memory,
   wherein the first integrated processor block is programmable to perform a first function and reprogrammable in real-time to perform a second function that is different than the first function to assist a second integrated processor block of the plurality of integrated processor blocks of the network on a chip in response to a determination that a workload of the second integrated processor block has exceeded a threshold, the second integrated processor block including a second inbox to receive incoming packets from the other integrated processor blocks of the plurality of integrated processor blocks of the network on a chip, a second outbox to send outgoing packets to the other integrated processor blocks of the plurality of integrated processor blocks of the network on a chip, a second on-chip memory, and a second memory management unit to enable access to the second on-chip memory, and wherein the second integrated processor block is programmed to perform the second function, wherein the threshold is associated with a performance statistic, wherein the performance statistic may include a number of central processing unit (CPU) cycles executed to render an object, a time taken to render an object, a number of instruction to render an object, another performance statistic, or any combination thereof.

2. The first integrated processor block of claim 1, wherein the first integrated processor block is programmable via software instructions to perform the first function.

3. The first integrated processor block of claim 1, wherein the first integrated processor block is programmable to perform at least one of a host interface processor function or a geometry engine function.

4. The first integrated processor block of claim 1, wherein the first integrated processor block is further operable to wake from a low-power sleep state and perform one or more actions.

5. The first integrated processor block of claim 4, wherein the first integrated processor block is woken from the low-power sleep state via an interrupt.

6. The first integrated processor block of claim 4, wherein the one or more actions include querying the first inbox for new incoming packets.

7. The first integrated processor block of claim 1, wherein the first integrated processor block is further operable to perform one or more actions based on the incoming packets at the first inbox.

8. The first integrated processor block of claim 1, wherein the first integrated processor block is further operable to perform one or more actions based a content of the first on-chip memory.

9. The first integrated processor block of claim 1, wherein the first integrated processor block measures performance statistics when performing the first function or the second function.

10. The first integrated processor block of claim 1, wherein the first integrated processor block is further operable to receive one or more incoming packets at the first inbox, process the incoming packets, and send results based on processing the incoming packets to at least one of the other integrated processor blocks.

11. The first integrated processor block of claim 1, wherein the first integrated processor block is further operable to perform an action that causes at least one of the other integrated processor blocks to wake up from a low-power sleep state.

12. The first integrated processor block of claim 1, wherein the first integrated processor block is further operable to write data to an external memory without using the first outbox.

13. The first integrated processor block of claim 12, wherein the first integrated processor block is further operable to send an outgoing packet that includes a location of the data at the external memory.

14. The first integrated processor block of claim 1, wherein the first on-chip memory of the first integrated processor block is used to buffer at least one of the incoming packets or at least one of the outgoing packets.

15. The first integrated processor block of claim 1, wherein the first integrated processor block is programmable or reprogrammable to perform at least one of a rasterizer function, a pixel shader function, a ray tracing function, a Z-test function, a physics accelerator function, a regular expression parse function, an encrypt/decrypt function, or a H.264 video codec function.

16. A computer program product comprising a non-transitory computer usable medium having computer usable program code embodied therewith, the computer usable program code executable by a processor to:
 program a first integrated processor block of a plurality of integrated processor blocks of a network on a chip to perform a first function, the first integrated processor block including a first inbox to receive incoming packets from the other integrated processor blocks of the plurality of integrated processor blocks of the network on a chip, a first outbox to send outgoing packets to the other integrated processor blocks of the plurality of integrated processor blocks of the network on a chip, a first on-chip memory, and a first memory management unit to manage the first on-chip memory;
 program a second integrated processor block of the plurality of integrated processor blocks of the network on a chip to perform a second function, the second integrated processor block including a second inbox to receive incoming packets from the other integrated processor blocks of the plurality of integrated processor blocks of the network on a chip, a second outbox to send outgoing packets to the other integrated processor blocks of the plurality of integrated processor blocks of the network on a chip, a second on-chip memory, and a second memory management unit to manage the second on-chip memory, wherein the second function is different than the first function;
 determine a workload associated with the second integrated processor block; and
 in response to the workload associated with the second integrated processor block exceeding a threshold, reprogram in real-time the first integrated processor block to perform the second function that is different than the first function to assist the second integrated processor block, wherein the threshold is associated with a performance statistic, wherein the performance statistic may include a number of central processing unit (CPU) cycles executed to render an object, a time taken to render an object, a number of instruction to render an object, another performance statistic, or any combination thereof.

17. A method, comprising:
 programming a first integrated processor block of a plurality of integrated processor blocks of a network on a chip to perform a first function, the first integrated processor block including a first inbox to receive incoming packets from the other integrated processor blocks of the plurality of integrated processor blocks of the network on a chip, a first outbox to send outgoing packets to the other integrated processor blocks of the plurality of integrated processor blocks of the network on a chip, a first on-chip memory, and a first memory management unit to enable access to the first on-chip memory;
 programming a second integrated processor block of the plurality of integrated processors blocks of the network on a chip to perform a second function, the second integrated processor block including a second inbox to receive incoming packets from the other integrated processor blocks of the plurality of integrated processor blocks of the network on a chip, a second outbox to send outgoing packets to the other integrated processor blocks of the network on a chip, a second on-chip memory, and a second memory management unit to enable access to the second on-chip memory, wherein the second function is different than the first function;
 determining a workload associated with the second integrated processor block; and in response to the workload associated with the second integrated processor block exceeding a threshold, reprogramming in real-time the first integrated processor block to perform a third function that is different than the first function, wherein the threshold is associated with a performance statistic, wherein the performance statistic may include a number of central processing unit (CPU) cycles executed to render an object, a time taken to render an object, a number of instruction to render an object, another performance statistic, or any combination thereof.

18. The method of claim 17, further comprising dynamically changing an allocation of integrated processor blocks performing a particular function.

* * * * *